United States Patent
Steenackkers et al.

(10) Patent No.: US 11,208,572 B2
(45) Date of Patent: Dec. 28, 2021

(54) PROCESS FOR THE PRODUCTION OF A COATED RUBBER ITEM AND RUBBER ITEM

(71) Applicant: Robert Bosch GmbH, Stuttgart (DE)

(72) Inventors: Marin Steenackkers, Oud-Heverlee (BE); Nicolaas Gotzen, Kortenberg (BE)

(73) Assignee: Robert Bosch GmbH, Stuttgart (DE)

( * ) Notice: Subject to any disclaimer, the term of this patent is extended or adjusted under 35 U.S.C. 154(b) by 910 days.

(21) Appl. No.: 15/405,561

(22) Filed: Jan. 13, 2017

(65) Prior Publication Data
US 2017/0198163 A1 Jul. 13, 2017

(30) Foreign Application Priority Data
Jan. 13, 2016 (DE) ...................... 10 2016 200 292.9

(51) Int. Cl.
| | |
|---|---|
| *C09D 133/14* | (2006.01) |
| *B60S 1/38* | (2006.01) |
| *C08J 7/18* | (2006.01) |
| *B29C 48/154* | (2019.01) |
| *C08J 7/04* | (2020.01) |
| *C08J 7/043* | (2020.01) |
| *C08J 7/046* | (2020.01) |
| *B05D 1/26* | (2006.01) |
| *B05D 3/10* | (2006.01) |
| *B05D 5/08* | (2006.01) |
| *B29C 37/00* | (2006.01) |
| *C08J 3/24* | (2006.01) |
| *B29C 48/00* | (2019.01) |
| *B29K 21/00* | (2006.01) |
| *B29L 31/30* | (2006.01) |
| *C08K 3/04* | (2006.01) |

(52) U.S. Cl.
CPC ............ *C09D 133/14* (2013.01); *B05D 1/265* (2013.01); *B05D 3/108* (2013.01); *B05D 5/08* (2013.01); *B29C 37/0025* (2013.01); *B29C 48/154* (2019.02); *B60S 1/38* (2013.01); *C08J 3/24* (2013.01); *C08J 7/043* (2020.01); *C08J 7/046* (2020.01); *C08J 7/0427* (2020.01); *C08J 7/18* (2013.01); *B29C 48/022* (2019.02); *B29K 2021/00* (2013.01); *B29L 2031/305* (2013.01); *B60S 2001/3829* (2013.01); *B60S 2001/3898* (2013.01); *C08J 2323/16* (2013.01); *C08J 2333/14* (2013.01); *C08J 2433/08* (2013.01); *C08K 3/04* (2013.01); *C08K 2201/003* (2013.01)

(58) Field of Classification Search
CPC ..................................................... C09D 133/14
USPC ...................................................... 427/385.5
See application file for complete search history.

(56) References Cited

U.S. PATENT DOCUMENTS

2008/0016644 A1* 1/2008 Mizote ................ B60S 1/38
15/250.361

FOREIGN PATENT DOCUMENTS

| | | | |
|---|---|---|---|
| DE | 102010003139 | | 9/2011 |
| DE | 102010003139 A1 * | 9/2011 | ........... B29C 35/041 |
| GB | 1120803 * | 7/1968 | ............ B05D 5/083 |
| WO | 03080717 | | 10/2003 |

* cited by examiner

*Primary Examiner* — Tabatha L Penny
(74) *Attorney, Agent, or Firm* — Michael Best & Friedrich LLP

(57) ABSTRACT

A process for the production of a coated rubber item, comprising:
(i) provision of a semifinished product having the main shape of the rubber item, where the semifinished product is composed of a rubber composition comprising at least one rubber and at least one crosslinking agent;
(ii) coating of the semifinished product with a solvent-free coating composition comprising at least one monomer amenable to free-radical polymerization,
(iii) crosslinking of the rubber composition and polymerization of the coating composition, to give a coated rubber item;
wherein the boiling point of the at least one monomer amenable to free-radical polymerization is ≥150° C. and the crosslinking of the rubber composition takes place at the same time as the polymerization of the coating composition.

12 Claims, 1 Drawing Sheet

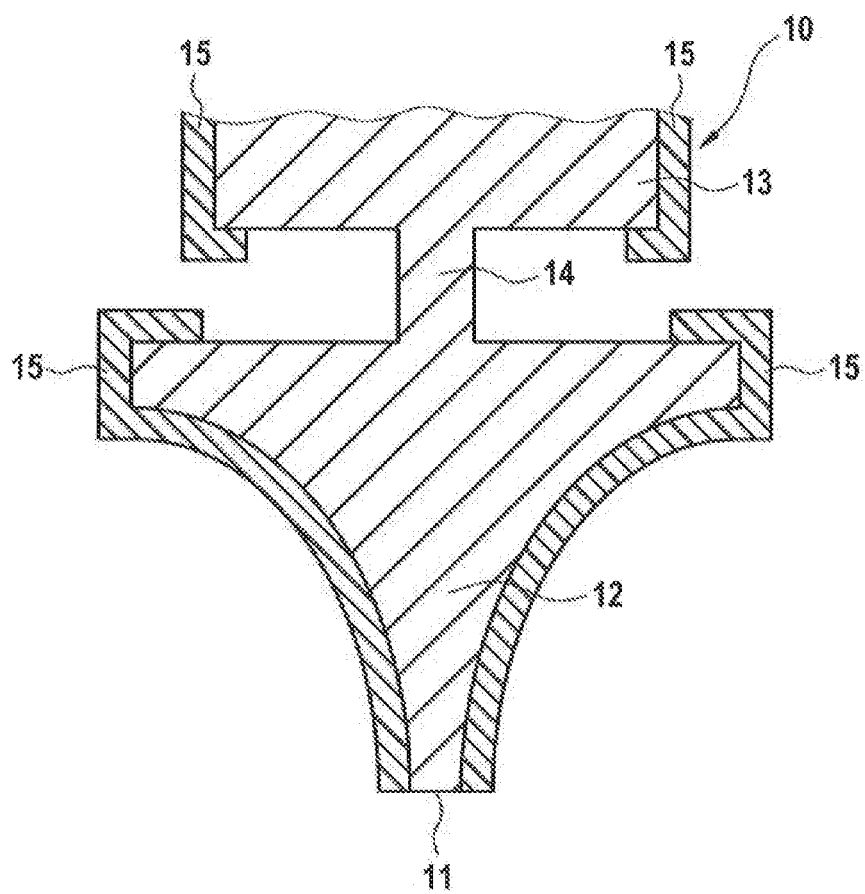

PROCESS FOR THE PRODUCTION OF A COATED RUBBER ITEM AND RUBBER ITEM

BACKGROUND OF THE INVENTION

The invention relates to a process for the solvent-free coating of rubber items, and also to the coated rubber items produced by this process. The invention also relates to a friction-reducing surface coating.

The invention relates to a process for the production of a rubber item which has a coating which provides advantageous properties to the surface of the rubber item, in particular a reduced coefficient of friction.

A rubber item of this type is known by way of example from WO 03/080717 A1. That document discloses a process for the production of a wiper rubber where, in order to improve antifriction properties, the wiper rubber is coated with an antifriction lacquer, which is hardened with exposure to ultraviolet radiation. According to one embodiment, the antifriction lacquer comprises graphite as lubricant, an acrylate as radiation-crosslinkable binder, and also a solvent, in particular water. Polymerization is initiated with the aid of a photoinitiator and ultraviolet radiation. The process described comprises extrusion of the rubber profile and then vulcanization in a salt bath and then coating with the antifriction lacquer. This multistage curing process is lengthy because it begins with production of a vulcanized rubber item to which a coating of antifriction lacquer must be provided, and which then has to be cured. The vulcanization times or hardening times required for this are not acceptable for inline manufacture, which is generally used for mass-production items such as wiper-rubber profiles. It is moreover disadvantageous that the resultant rubber item has a tendency toward delamination of the coating, because inadequate bonding is achieved between the surface of the rubber item and the coating layer.

The problems mentioned are solved via the production process described below and the resultant coated rubber item.

SUMMARY OF THE INVENTION

A process is proposed for the production of a coated rubber item, comprising the following steps:
(i) provision of a semifinished product having the main shape of the rubber item, where the semifinished product is composed of a rubber composition comprising at least one rubber and at least one crosslinking agent;
(ii) coating of the semifinished product with a solvent-free coating composition comprising at least one monomer amenable to free-radical polymerization,
(iii) crosslinking of the rubber composition and polymerization of the coating composition, to give a coated rubber item;

characterized in that the boiling point of the at least one monomer amenable to free-radical polymerization is ≥150° C. and the crosslinking of the rubber composition takes place at the same time as the polymerization of the coating composition.

The semifinished product of the invention is composed of a rubber composition which comprises at least one rubber and at least one crosslinking agent. The at least one rubber here constitutes from 80 to 99.99% by weight of the rubber composition, and the at least one crosslinking agent constitutes from 0.01 to 3% by weight of the rubber composition.

A suitable rubber is in principle any of the vulcanizable compositions involving natural or synthetic polymers or copolymers which, in the presence of crosslinking agents that from free radicals, can be converted to elastomers (i.e. crosslinked rubber). Examples of suitable rubbers are materials such as isoprene rubber (nature rubber, NR), styrene-butadiene rubber (SBR), butadiene rubber (BR), acrylonitrile-butadiene rubber (NBR), chloroprene rubber (CR), ethylene-propylene rubber (EPDM), and mixtures thereof.

It is preferable that the rubber composition constitutes a composition which comprises EPDM rubber, particularly a composition in which the proportion of EPDM rubber constitutes at least 50% by weight, in particular at least 70% by weight, of the rubber composition. One embodiment of the invention uses exclusively EPDM rubber as rubber component, the EPDM rubber content therefore constituting from 80 to 99.99% by weight of the rubber composition.

Crosslinking agent used can in principle be any compound which is known to the person skilled in the art and which is suitable in the context of the production process to provide free radicals to crosslink the rubber molecules, i.e. to vulcanize the rubber, and to produce an elastomer polymer. Preferred crosslinking agents are thermally labile compounds which decompose at elevated temperatures (e.g. >100° C., in particular >140° C.) with formation of free radicals. Particular preference is given to inorganic and organic peroxide compounds, in particular organic peroxide compounds. Examples here are peroxide compounds such as potassium persulfate ($K_2S_2O_8$), N,N-azobisisobutyronitrile (AIBN), dibenzoyl peroxide (BPO), dicumyl peroxide, di-tert-butyl peroxide and mixtures thereof.

In one preferred embodiment the rubber composition in the present process comprises a quantity of at least 50% by weight, in particular at least 70% by weight of the rubber composition, of EPDM as rubber, and comprises a peroxide compound selected from dicumyl peroxide and di-tert-butyl peroxide as crosslinking agent.

The rubber composition can moreover comprise conventional additives. Examples are fillers such as carbon black, silica or chalks, plasticizers such as mineral oils, mastication aids, processing aids, adhesion promoters, aging retarders and crosslinking aids such as vulcanization catalysts or crosslinking comonomers. The additives here can constitute from 0 to 19.99% by weight of the rubber composition.

In one embodiment the rubber composition comprises at least one crosslinking comonomer which serves for improved crosslinking of the rubber, and also for better bonding of the coating layer to the main structure of the rubber item. The crosslinking comonomer is selected by way of example from an acrylate or methacrylate monomer amenable to free-radical polymerization. The quantity of the crosslinking comonomer constitutes by way of example from 1 to 10% by weight of the rubber composition. A particularly preferred rubber composition comprises by way of example EPDM as rubber and ethylene glycol dimethacrylate (EGDMA) as crosslinking comonomer.

The rubber composition is obtained by mixing of the constituents in the desired quantities. This can be achieved batchwise with the aid of roll mills or internal mixers, or else continuously in mixing extruders. Care has to be taken here that the temperature of the composition is kept as low as possible, preferably ≤140° C., in particular ≤120° C., in order to avoid premature vulcanization of the rubber composition.

The resultant rubber composition is converted to the desired shape, which corresponds to the shape of the subsequent rubber item. The resultant intermediate product is termed semifinished product. The shaping can be achieved by any of the processes known to the person skilled in the art. By way of example, mention may be made of extrusion processes, calendering processes, and compression processes. It is preferable that the shaping is achieved via an extrusion process. This process of shaping rubber compositions via suitable extruders is known to the person skilled in the art.

It is preferable that the rubber item produced by the process is a wiper-rubber profile of a windshield wiper. The semifinished product is accordingly by way of example extruded in the form of continuous profile by a suitable shaping process, in particular an extrusion process.

In the step that follows the above, a coating made of a coating composition is provided to all or part of the surface of the semifinished product. A feature of this coating composition is that it comprises no solvent. The term solvent means in this context volatile inorganic or organic compounds with boiling point below 200° C. which do not participate as contributor (e.g. starting material, initiator, catalyst) in any of the reactions featuring in the process.

The coating composition comprises at least one monomer amenable to free-radical polymerization. The boiling point of the at least one monomer amenable to free-radical polymerization is ≥150° C., preferably ≥180° C., in particular ≥210° C. It is thus possible for the coating composition to remain stable in the subsequent curing step, even at elevated temperatures, and not to be lost by evaporation from the surface requiring coating.

The melting point of the monomer amenable to free-radical polymerization is moreover also preferably above 60° C., in particular above 80° C.

Another feature of the at least one monomer amenable to free-radical polymerization is that the glass transition temperature $T_G$ of the homopolymer of the monomer or of the copolymer of a monomer mixture is below 20° C., measured by means of differential scanning calorimetry (DSC). It is preferable that the glass transition temperature $T_G$ is below 0° C., particularly below −20° C., in particular below −30° C.

Examples of suitable monomers amenable to free-radical polymerization are monomers having ethylenically unsaturated functional groups (i.e. terminal carbon-carbon double bonds). Preferred examples of these monomers amenable to free-radical polymerization are monomers having at least one functional group selected from an acrylate group, a methacrylate group, an acrylamide group, a methacrylamide group, a styryl group and a vinyl group. The monomers amenable to free-radical polymerization can moreover have one or more substituents. Examples of suitable substituents are moieties selected from halogen atoms such as fluorine atoms, chlorine atoms, bromine atoms or iodine atoms, linear or branched, unsaturated or (preferably) saturated alkyl moieties having from 1 to 6 carbon atoms, for example methyl groups, ethyl groups, propyl groups or isopropyl groups, and also linear or branched, unsaturated or (preferably) saturated alkoxy moieties having from 1 to 6 carbon atoms, for example methoxy groups, ethoxy groups or isopropoxy groups.

It is preferable that the monomer amenable to free-radical polymerization is an acrylate monomer or a methacrylate monomer, in particular a methacrylate monomer.

Particularly suitable examples are monomers amenable to free-radical polymerization of the formula (I) below:

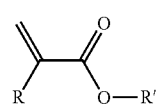

(I)

where R is H or $CH_3$ and
R' is a linear or branched, saturated or unsaturated alkyl moiety having from 8 to 30 carbon atoms, a linear or branched, saturated or unsaturated ether moiety having from 4 to 30 carbon atoms, or a linear or branched, saturated or unsaturated ester moiety having from 4 to 30 carbon atoms. Particular preference is given to monomers amenable to free-radical polymerization of the formula (I) where R is $CH_3$ and R' is a linear, saturated alkyl moiety having from 10 to 14 carbon atoms or a linear or branched unsaturated ester moiety having from 5 to 16 carbon atoms. Examples of preferred monomers are lauryl methacrylate, n-decyl methacrylate, ethyl triglycol methacrylate (ETMA), ethylene glycol dimethacrylate (EGDMA) and trimethylolpropane trimethacrylate (TMPTMA).

The monomers amenable to free-radical polymerization can be used respectively individually or in combination with one another (i.e. in the form of a monomer mixture). The monomers amenable to free-radical polymerization preferably constitute from 27 to 89.99% by weight of the coating composition, preferably from 37 to 79.99% by weight, in particular from 47 to 69.99% by weight.

The coating composition preferably moreover comprises at least one friction-reducing additive which serves to improve the antifriction properties of the surface coating, in that frictional resistance is reduced. The friction-reducing additive can by way of example be selected from graphite, polytetrafluoroethene (PDFE), $MoS_2$ and/or polyamide. The friction-reducing additive preferably comprises graphite particles.

The particle size of the at least one friction-reducing additive is by way of example in the range from ≥1 μm to ≤10 μm, in particular from ≥1 μm to ≤50 μm. The quantity of friction-reducing additive, in particular graphite particles, preferably constitutes from 10 to 70% by weight of the coating composition, more preferably from 20 to 60% by weight, in particular from 30 to 50% by weight.

In one embodiment, the solvent-free coating composition comprises at least one thermal initiator. This is a compound which is thermally labile, i.e. decomposes at elevated temperatures (e.g. >100° C., in particular >140° C.) to give free radicals. Suitable thermal initiators are potassium persulfate ($K_2S_2O_8$), N,N-azobisisobutyronitrile (AIBN), dibenzoyl peroxide (BPO), dicumyl peroxide, di-tert-butyl peroxide and mixtures thereof. The at least one thermal initiator preferably constitutes from 0.01 to 3% by weight of the coating composition, more preferably from 0.1 to 2% by weight, in particular from 0.5 to 1.5% by weight.

The coating composition can optionally comprise other auxiliaries in order to improve the properties of the composition. Particular auxiliaries relevant here are wetting agents, for example alkoxylated acetylenediols, in particular ethoxylated acetylenediols (e.g. 2,5,8,11-tetramethyl-6-dodecyne-5,8-diol ethoxylate), polyether-modified polysiloxanes, in particular polyether-modified dimethylpolysiloxanes, or fluorohydrocarbon-modified polyacrylates. The quantity of these added to the coating composition can be up to 3% by weight.

The coating composition can in principle be applied by any coating process known to the person skilled in the art on at least part of the surface of the semifinished rubber product, for example via dip-coating, roll-coating, bar-coating, brush-coating, spray-coating, doctor-coating, curtain-coating, rotational coating or die-coating. Among these, preference is given to spray-coating (including inkjet printing processes and valve jet printing processes), dip-coating, and curtain-coating. Coating is preferably carried out at a temperature at which the coating composition is liquid. By way of example, coating is carried out at a temperature above 60° C., in particular in the temperature range from 60° C. to 140° C. It is preferable that the temperature of the surface of the semifinished rubber product is also in the range from 60° C. to 140° C. The thickness of the resultant coating layer is preferably from ≥0.1 to ≤50 µm, particularly preferably from ≥1 to ≤25 µm, in particular from ≥5 to ≤15 µm.

Once the coating composition has been provided to at least part of the surface of the semifinished rubber product, vulcanization of the rubber is induced via introduction of heat. The composition described for the rubber composition and for the coating composition permits thermal initiation of crosslinking of the semifinished product (i.e. vulcanization of the rubber) and of curing of the coating composition (i.e. polymerization of the coating composition). Introduction of heat converts the crosslinking agents present in the rubber composition to free radicals which bring about crosslinking (vulcanization) of the rubber, in that a free-radical mechanism produces links between the double bonds present in the rubber. This process can optionally be improved by adding suitable vulcanization catalysts or vulcanization accelerators. During this process free radicals present on the surface of the semifinished product, or produced there, come into contact with the coating layer and with the monomers amenable to free-radical polymerization present therein. These free radicals at the surface thus initiate polymerization of the coating layer. The polymer chains which are present in the coating layer and formed from the monomers amenable to free-radical polymerization are thus grafted onto the surface of the rubber or of the elastomer/crosslinked rubber. This produces uniform and intimate bonding of the surface coating to the surface of the crosslinked rubber or rubber item, because a large number of covalent bonds is formed between the two components: rubber and coating layer.

In one embodiment the coating composition can comprise thermal initiators which form free radicals and which thus improve polymerization of the coating layer. Curing of the coating composition is thus induced via decomposition of the thermal initiators present therein. The decomposition produces free radicals which induce free-radical polymerization of the monomers amenable to free-radical polymerization. The coating layer is thus converted to a polymer layer into which the optionally present friction-reducing additive and auxiliaries have been incorporated.

The respective reactions proceeding by a free-radical reaction mechanism can moreover transcend the interface between the semifinished rubber product and the coating layer, in that free radicals from the rubber initiate polymerization of monomers from the coating layer, or react with free radicals from the coating layer. Similarly, free radicals from the coating layer can initiate vulcanization of the semifinished rubber product or react with suitable double bonds from the rubber. Improved adhesion between the two layers (rubber and coating layer) is thus achieved because the two layers are bonded to one another via a large number of covalent bonds.

In one preferred embodiment not only the rubber composition but also the coating composition comprises at least one thermally labile peroxide compound. In one particularly preferred embodiment the same compound is used in the rubber composition and in the coating composition. Examples of suitable peroxide compounds are dicumyl peroxide and di-tert-butyl; peroxide. It is thus ensured that the thermally initiated reactions in the rubber composition and in the coating layer begin at the same temperature and therefore as simultaneously as is possible.

Vulcanization of the rubber composition and polymerization of the coating layer are brought about by heating the coated semifinished rubber product to a temperature which is above the temperature at which the thermal decomposition of the crosslinking agent and, respectively, of thermal initiator begins in at least one of the compositions (i.e. the rubber composition and, respectively, the coating composition). The temperature is preferably ≥150° C., more preferably ≥175° C., in particular ≥200° C., for example in the range from ≥200 to ≤250° C., in particular the range from ≥210 to ≤230° C.

The temperature increase can be achieved in any manner known to the person skilled in the art, e.g. via a hot-air method, a salt-bath method or a microwave method. For process-technology reasons it is particularly preferable that the vulcanization of the semifinished product and polymerization of the coating composition are carried out in a salt bath. The salt bath is by way of example a mixture of 50% by weight of $KNO_3$, 40% by weight of $NaNO_2$ and 10% by weight of $NaNO_3$, its melting point being about 150° C. It is inert to rubbers, and thus permits vulcanization and polymerization with exclusion of atmospheric oxygen.

The coated rubber item can then be freed from contaminants and any excess monomer by suitable washing processes, and optionally converted to the desired dimensions by cutting-to-size.

The invention also provides a coated rubber item obtained by the process described. A feature of this is, as described above, that the coating layer and the main structure of the rubber item, composed of crosslinked rubber, have been bonded to one another by a large number of covalent bonds. Application of the coating layer is therefore particularly effective, and breakaway of the layer or delamination is prevented.

The invention also provides a coated rubber item, a feature of which is that the rubber item comprises a structure made of crosslinked rubber on which a polymer layer obtained via free-radical polymerization of ethylenically unsaturated monomers with boiling point ≥150° C. has been grafted. This rubber item is in particular characterized in that there is covalent bonding between the polymer layer or coating layer and the main structure made of crosslinked rubber.

In one preferred embodiment the coated rubber item has a gradient in its material composition, so that—starting from the coating surface of the coated rubber item—the elastomer content in the material composition increases continuously. A continuous increasing gradient is obtained in particular when the rubber composition comprises an admixture of a crosslinking comonomer, in particular a crosslinking comonomer which is also present in the coating composition. In one embodiment the rubber composition comprises EPDM rubber and ethylene glycol dimethacrylate (EGDMA) as crosslinking comonomer, and the coating composition comprises ethylene glycol dimethacrylate (EGDMA) as monomer amenable to free-radical polymerization. The coated rubber item obtained therefrom by the process described features a particularly continuous gradient of material composition and intimate bonding between the coating layer and the main structure of the rubber item.

The invention further provides a friction-reducing surface coating which is obtainable via
(a) application, to a surface requiring coating, of a coating composition comprising the following: at least one monomer with boiling point above 150° C. amenable to free-radical polymerization, at least one friction-reducing additive and at least one thermal initiator, and
(b) heating of the coated surface to a temperature above the decomposition temperature of the initiator.

The constituents of the coating composition constituting the surface coating correspond in all practical details to the constituents of the coating composition described above. The friction-reducing surface coating is preferably applied to the surface of a rubber item and also to the surface of an article across which a rubber item thus coated is intended to slide. This combination of the friction-reducing surface coating on both surfaces intended to slide across one another achieves particularly effective reduction of frictional resistance. In a preferred embodiment the rubber item is by way of example a wiper-rubber profile of a windshield wiper, and the article over which the rubber item is intended to slide is a glazing unit, for example a windshield of a motor vehicle. The windshield here can by way of example be made of glass or of a plastic. The windshield is preferably made of a plastic.

The process presented permits significant reduction of the time required for the production of a coated rubber item.

The process allows vulcanization of the rubber composition and polymerization of the coating composition to be carried out in a single step, with the resultant reduction of the time, and also the costs, for the production of coated rubber items. Additionally, because no solvents are present, there is no requirement for drying of the coating layer prior to polymerization.

Another feature of the coated rubber item produced by the process, in comparison with rubber items produced conventionally, is improved properties. The production process described gives surface coatings on rubber items where a large number of covalent bonds bond the surface coating to the surface of the rubber item. A feature of the product is therefore that the surface coating is particularly resistant to breakaway or delamination.

Combination with another surface which has the same coating layer therefore achieves improved antifriction properties and particularly low coefficients of friction.

DESCRIPTION OF THE DRAWING FIGURE

The single drawing FIGURE is a partial, cross-sectional view of a windshield wiper according to the invention.

DETAILED DESCRIPTION

The drawing partially depicts a windshield wiper comprising a semifinished rubber product in the form of a wiper-rubber profile 10 which comprises a wiper lip 12 which has a wiping edge 11 and is made of a rubber composition composed of 100 parts by weight of EPDM rubber and 2 parts by weight of di-tert-butyl peroxide, a stock 13, only part of which is depicted here, made of the rubber composition, and, arranged between the stock 13 and the wiper lip 12, what is known as a tiltable web 14 made of the rubber composition.

The wiper lip 12, the stock 13 and the tiltable web 14 have a surface composed of a coating layer 15 which in the interests of visibility has been enlarged in the depiction in comparison with the wiper lip 12, the stock 13, and the tiltable web 14. The thickness of the coating layer 15 here is about 10 μm, and it is composed by way of example of 54% by weight of ethyl triglycol methacrylate (ETMA), 45% by weight of graphite particles with diameter from 30 to 50 μm and 1% by weight of di-tert-butyl peroxide.

In the present case the coating layer 15 is present only in the regions that can generally come into contact with a glazing unit of a motor vehicle during the wiping procedure. However, in other embodiments of the process of the invention it is also possible that the coating layer 15 is present over the entire surface.

The wiper-rubber profile 10 depicted in the drawing is produced by first extruding a main shape composed of the stock 13, the tiltable web 14 and the wiper lip 12, and then applying the coating composition described above thereto through a nozzle. The resultant coated semifinished rubber product is vulcanized in a salt bath (50% by weight of $KNO_3$, 40% by weight of $NaNO_2$, 10% by weight of $NaNO_3$) at 220° C. The coating layer 15 is polymerized simultaneously.

Pretreatment of the surface of the rubber structure constituted by the wiper lip 12, by the tiltable web 14 and by the stock 13 can sometimes be necessary in order to produce a homogeneous surface. After vulcanization of the semifinished rubber product and polymerization of the coating layer 15 the wipe-rubber profile 10, in particular the wiper lip 12, is subjected to a wash process and cut to the desired dimension.

The invention is not restricted to the embodiments described here and the aspects highlighted therein. Within the scope provided by the claims there are many possible modifications available to the person skilled in the art.

The invention claimed is:
1. A method of producing a friction-reducing coating, the method comprising
   a) applying, to a surface to be coated, a coating composition comprising the following: at least one monomer with boiling point above 150° C. amenable to free-radical polymerization, at least one friction-reducing additive and at least one thermal initiator, and
   b) heating the coated surface to a temperature above the decomposition temperature of the thermal initiator.
2. The method according to claim 1, wherein the surface is the surface of a rubber item or is the surface of an article across which a rubber item is intended to slide.
3. The method according to claim 2, wherein the rubber item is a wiper-rubber profile (10) of a windshield wiper and the article over which the rubber item is intended to slide is a windshield.
4. A process for the production of a coated rubber item, comprising the following steps:
   (i) providing a semifinished product having a main shape of a rubber item to be coated, wherein the semifinished product is composed of a rubber composition comprising at least one rubber and at least one crosslinking agent;
   (ii) coating the semifinished product with a solvent-free coating composition comprising at least one monomer amenable to free-radical polymerization, a friction reducing additive and optionally at least one thermal initiator, and
   (iii) crosslinking of the rubber composition and polymerization of the solvent-free coating composition, to give a coated rubber item;

characterized in that the boiling point of the at least one monomer amenable to free-radical polymerization is ≥150° C. and the crosslinking of the rubber composition takes place at the same time as the polymerization of the coating composition.

5. The process according to claim 4, characterized in that the crosslinking agent is a peroxide compound.

6. The process according to claim 4, characterized in that the at least one monomer amenable to free-radical polymerization has at least one functional group selected from an acrylate group, a methacrylate group, an acrylamide group, a methacrylamide group, a styryl group and a vinyl group.

7. The process according to claim 4, characterized in that the glass transition temperature $T_G$ of a homopolymer of the monomer amenable to free-radical polymerization or of a copolymer of a mixture of monomers comprising the monomer amenable to free-radical polymerization is below 20° C., measured by means of differential scanning calorimetry (DSC).

8. The process according to claim 4, characterized in that the melting point of the at least one monomer amenable to free-radical polymerization is above 60° C.

9. The process according to claim 4, characterized in that step (iii) is carried out in a salt bath.

10. The process of claim 4, wherein the crosslinking of the rubber composition forms a crosslinked rubber, wherein the at least one monomer comprises ethylenically unsaturated monomers, and wherein the polymerization of the solvent-free coating composition comprises free-radical polymerization of the ethylenically unsaturated monomers to form a polymer layer that is grafted to the crosslinked rubber.

11. The process of claim 4, further comprising
providing the rubber composition, wherein the rubber composition further comprises a crosslinking comonomer, and wherein the cross-linking comonomer comprises polymerizable acrylate or methacrylate monomers, and
wherein the semifinished product having the main shape of the rubber item is formed out of the rubber composition.

12. The process of claim 4, characterized in that step (ii) is performed at a temperature above 60° C.

* * * * *